W. E. Prall,
Water-Elevator.
" 3,643. Reissued Sep. 21. 1869.
Fig. 2.
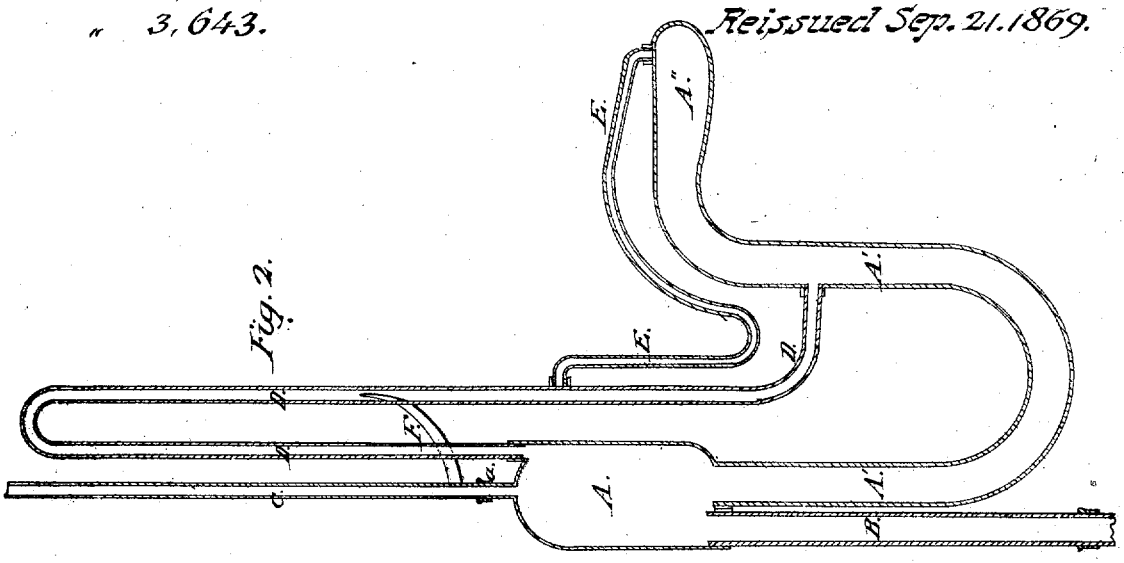
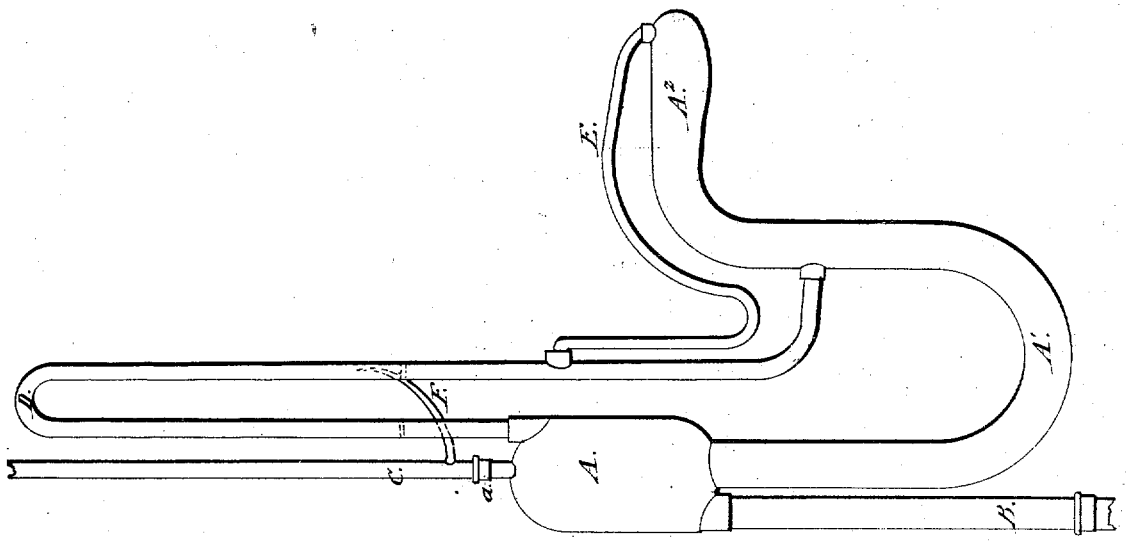
Attest:
A. Ruppert
C. F. Clausen.
Inventor:
W. E. Prall
D. P. Holloway & Co.
N. PETERS, PHOTO-LITHOGRAPHER, WASHINGTON, D. C.

United States Patent Office.

WILLIAM E. PRALL, OF WASHINGTON, DISTRICT OF COLUMBIA, AND A. C. RAND, OF NEW YORK, N. Y., ASSIGNEES OF WILLIAM E. PRALL.

*Letters Patent No.* 92,357, *dated July* 6, 1869; *reissue No.* 3,643, *dated September* 21, 1869.

IMPROVEMENT IN STEAM WATER-ELEVATORS.

The Schedule referred to in these Letters Patent and making part of the same.

*To all whom it may concern:*

Be it known that I, WILLIAM E. PRALL, of Washington, in the county of Washington, and District of Columbia, have invented a new and useful Improvement in Water-Elevators; and I do hereby declare that the following is a full, clear, and exact description of the same, reference being had to the annexed drawings, making a part of this specification, in which—

Figure 1 is an elevation of my improved elevator, and

Figure 2 is a vertical sectional elevation of the same.

Corresponding letters in both figures refer to corresponding parts.

This invention relates to that class of devices which elevates water by means of steam, which is generated within such device, and which is afterward condensed therein, for the purpose of forming a vacuum for permitting the influx of more water, it being designed for an improvement upon the one for which Letters Patent were granted to me on the 21st day of April, 1868, and consisting of a new combination and arrangement of the parts of which it is composed, as will be more fully described hereinafter.

A, in the drawings, represents a vessel, into which the water enters from the well, or other source of supply, when the device is in operation.

To the lower portion of this vessel there is to be attached a cylinder or pipe, $A^1$, which may be a constituent part of such vessel, or it may be a separate part, and be secured thereto in any suitable manner.

This cylinder or pipe extends downward for some distance, where it is to be bent or turned outward for some distance, and again turned upward, in which direction it extends for any required distance, and is again turned outward in a horizontal, or nearly horizontal position, and terminates in a somewhat enlarged portion, $A^2$, which serves the purpose of a steam-generator.

It will be apparent that each of the parts numbered A $A^1$ $A^2$ may be cast or formed of separate pieces, and screwed or otherwise secured together, but, as a matter of convenience, I prefer to cast or form them of a single piece, when constructing small engines.

That portion of the cylinder or pipe above referred to, which is marked $A^2$, I designate and propose to use as a steam-generator, it being supplied with water, in a manner soon to be described.

It will be apparent that the form of this portion of the device may be varied to suit the location in which it is to be placed, and the circumstances under which it is to be used.

The location and dimensions of this generator should be such that the amount of water contained therein will always be less than the amount which the vertical portion of the cylinder, or portion A of the pipe contains, so that as water is expelled from the generator, the hot water will not be forced out of such cylinder or pipe.

B represents an induction-pipe, which is to be secured to the lower portion of the vessel A, and is to extend down into the well, or other source of supply, and is to be supplied at its lower end with an ordinary or any other check-valve.

This cylinder or pipe may be secured to the vessel in any suitable manner, the most convenient being that of a thread upon its end, to screw into a female thread to be cut into a projection to be formed upon the vessel.

C represents the water-discharge pipe, which is to be secured to the upper portion of vessel A, and is to have in it, at a short distance above such vessel, a check-valve, opening upward or outward, for the purpose of preventing the return of water from such pipe to the vessel. This pipe is to be of any length required to convey the water to the desired location, and it may be bent, or otherwise arranged to that end.

D represents a pipe, one end of which is secured to the upper portion of the vessel A, above which it extends vertically for some distance, when it is to be bent, or otherwise caused to turn downward, in which direction it extends in a line nearly parallel with the upwardly-projecting portion, and until it reaches the proper point to be connected to the vertical portion of the cylinder or pipe $A^1$, when it is to be turned outward and joined to such cylinder or pipe, with which it communicates for a purpose soon to be explained.

E represents a pipe, which is to be attached to the steam-space of the generator, from which point it is to be carried toward the pipe D, but, before reaching which, it is to be bent downward to a point somewhat below the lower portion or surface of the steam-generator, or it may be to any point down to which it is desired to discharge the water from the generator, it being apparent that by the location of this pipe, the quantity of water discharged may be regulated, when it is to be so bent or formed as to rise vertically alongside of pipe D, and enter the same, or communicate therewith at a point above the upper surface of the steam-generator.

The above-described arrangement of this pipe causes it to become the short leg of a siphon, and perform an office very analogous to a cut-off valve in an ordinary steam-engine.

F represents a pipe, which communicates with the discharge-pipe C at a point above the check-valve *a*, and which extends across, and is connected to and communicates with the downwardly-projecting portion of pipe D.

Upon that end of pipe F which enters pipe D there may be placed a small nozzle, which will extend upward for a short distance within pipe D, for the purpose of introducing a jet of cold water from the discharge-pipe C into the condenser, which, in this instance, consists of the pipe D, the upper portion thereof being used for that purpose.

The operation of this device will be as follows:

It is to be filled with water in all its parts, except the upper covered portion of the pipe D, which is to be left empty, in order that it may act as an air-chamber, to prevent the circulation of water between the vessel A and the generator, its elevation being such as to produce that result.

The parts having been supplied with water, as above indicated, a fire is to be kindled in or under the generator, and as steam accumulates therein, the water is forced downward into the hot-water cylinder or pipe, such water acting as a piston for the steam to press against, and as there is no obstruction in any of the connection, except what such water-piston offers, the pressure is at once communicated through that portion which serves as a condenser to the water in the vessel A, and the discharge-pipe C attached thereto discharges an amount of cold water exactly equal to the quantity of hot water that was forced into the hot-water cylinder or pipe from the generator.

It is apparent, however, that not all of the water contained in the hot-water cylinder or pipe will be discharged, for the reason that so soon as the water has been driven below the lowest portion of the pipe E, the steam which had previously acted upon the water will be allowed to pass through pipe E, into D, in the upper portion of which it will be condensed by the jet of water, which will enter through pipe F.

The condensation of the steam, as above described, will of course produce a vacuum in the pipe or condenser D, the effect of which will be to prevent water from flowing through the pipe B into vessel $A^1$; and hence it will be seen that the generator is, after the first discharge of water therefrom, always refilled with hot water, and that thus a great economy of fuel, as well as of time, is produced, especially as all the steam used is condensed and returned to the generator.

The office of the pipe E is to allow any steam which may be in the generator to escape after it has driven the water below the lowest point in such pipe, and thus permit the generator to refill with the water previously contained therein, as it is apparent that such water will not be expelled from the cylinder or pipe $A^1$, but only the cold water, which was contained in the opposite leg or portion of such pipe to the one to which the hot water is forced from the generator.

In addition to the function of a condenser, described as being performed by the upper portion of pipe D, it will be seen that it acts as an air-chamber, the air contained therein pressing equally upon the two columns of water, and thus preventing the water in either column from passing to the other, as would sometimes be the case, were it not for this arrangement of pipe D.

Having thus fully described my invention,

What I claim, and desire to secure by Letters Patent, is—

1. A water-elevating engine, combining in its construction a steam-generator, so arranged that it is supplied with hot water from the hot-water cylinder or pipe, a condenser, which receives its steam from the generator, a hot-water cylinder or pipe, in which the water acts as a piston for the steam to press against in expelling the cold water therefrom, and curved or siphon-pipes, in which the water which they contain acts as a valve to cut off the communication between the generator and the condenser, substantially as shown and described.

2. So arranging the condenser and siphon, or curved pipes of a water-elevating machine, that the steam which is used to expel the water from the generator or hot-water cylinder, shall afterward be used in the condenser to take the place of the receding water, as the generator is being refilled, and afterward be condensed for the purpose of forming a vacuum in such condenser, in order that water may flow in and refill such condenser, substantially as shown and described.

3. The combination of the reservoir A, the generator $A^2$, and connecting-pipe $A^1$, constructed and arranged substantially as set forth.

4. The arrangement of the reservoir A, the pipe D, and the cylinder or pipe $A^1$, substantially as shown and described.

5. The combination of pipe D, generator $A^2$, and the pipe E, substantially as shown and described.

6. The combination and arrangement of the discharge-pipe C, jet-pipe F, and pipe D, substantially as shown and described.

In testimony whereof, I have signed my name to this specification, before two subscribing witnesses.

W. E. PRALL.

Witnesses:

WM. T. FARNHAM,

GEO. W. FARNHAM.